United States Patent [19]

Herriage

[11] Patent Number: 4,564,152

[45] Date of Patent: Jan. 14, 1986

[54] APPARATUS FOR STORING AND TRANSPORTING WIRE ON REELS AND FOR DISPENSING WIRE FROM THE REELS

[76] Inventor: A. A. Herriage, P.O. Box 967, Jasper, Tex. 75951

[21] Appl. No.: 621,266

[22] Filed: Jun. 18, 1984

[51] Int. Cl.⁴ .................. B65H 17/40; B65H 17/46
[52] U.S. Cl. ............................. 242/86.5; 280/47.19
[58] Field of Search ............ 242/86.5 R, 77.2, 129.6, 242/129.61, 129.8, 156, 156.1, 75.4; 191/12.2 R, 12.4; 280/47.17, 47.19, 47.26–47.29

[56] References Cited

U.S. PATENT DOCUMENTS

| | | | |
|---|---|---|---|
| 2,705,114 | 3/1955 | Worsham | 242/86.5 R |
| 2,965,327 | 12/1960 | Blary | 242/77.2 |
| 3,072,357 | 1/1963 | Sprague et al. | 242/86.5 R |
| 3,134,555 | 5/1964 | Baker | 242/86.5 R |
| 3,796,392 | 3/1974 | Starace | 242/156 |
| 3,831,877 | 8/1974 | Bennett et al. | 242/86.5 R |
| 3,840,713 | 10/1974 | Carpentier | 191/12.2 R |
| 3,856,230 | 12/1974 | Zimmer | 242/86.5 R |
| 3,902,676 | 9/1975 | Bost | 242/129 |
| 4,006,865 | 2/1977 | Howard | 242/86.5 R |

*Primary Examiner*—Leonard D. Christian
*Attorney, Agent, or Firm*—Guy E. Matthews

[57] ABSTRACT

A new and useful apparatus for storing and transporting reels of wire and dispensing the wire from the reels is provided. The reels are mounted on upwardly projecting spindles and retained there by their own weight, so that no removable parts are required to secure them to the cart. A guide is provided to restrict the lateral motion of the reel so as to prevent the wire from becoming tangled, to prevent pull on the wire from unseating the reel from the spindle and to align the wire with its intended objective such as a conduit. Additionally, a bar may be provided to frictionally contact the reel and retard its spinning after wire is withdrawn from the reel.

12 Claims, 6 Drawing Figures

APPARATUS FOR STORING AND TRANSPORTING WIRE ON REELS AND FOR DISPENSING WIRE FROM THE REELS

This invention relates generally to apparatus for transporting and dispensing wire and more particularly concerns a device for storing and transporting reels of wire and dispensing the wire from those reels.

Wire used by electricians and others is commonly supplied by manufacturers or vendors would onto reels having a hollow core and a pair of spaced apart flanges. Individual reels may be carried to a job site by the electrician, but unwinding the wire from a stationary reel is awkward. Additionally, a number of reels become heavy and difficult to transport. For this reason, a number of inventors have developed portable carts for carrying reels of wire and for allowing the wire to be pulled from the reels. Although these carts are on improvement over the hand carrying of loose reels, they create problems themselves.

U.S. Pat. No. 2,705,114, issued to Worsham, discloses such a rack. However, the reels are mounted on removable spindles which are easily lost. Further there is no provision for halting the rotation of an already spinning reel when no more wire is desired. Additionally, no means is provided to restrict the lateral motion of the wire being pulled off the reel or to align the wire with its intended location such as a conduit.

U.S. Pat. No. 3,856,230, issued to Zimmer, discloses another wire cart. Removable spindles are again used, again creating the risk of their loss. Further, no means for restricting the lateral motion of the wire or aligning the wire with desired objective is provided. Although rubber straps are provided to contract the reel and prevent it from turning when no more wire is desired, they are also removable and easily lost, as well as being easily worn or damaged.

U.S. Pat. No. 3,134,555, issued to Baker, also provides a device for the storage of reels of wire and the dispensing of wire therefrom. However, Baker also used removable spindles which are easily lost. Again, no means for stopping the rotation of an already spinning reel is provided, nor is a guide to restrict the lateral movement of the wire or to align it with an intended location.

U.S. Pat. No. 2,965,327, issued to Blary, also uses removable reels of wire. However, it uses end retainers on its spindles which are removable and therefore easily lost. No device is provided to halt the rotation of an already spinning reel. Although a guide is provided which restricts the lateral movement of the wire coming off the reel, its location is not adjustable, therefore making it difficult to align the wire with its intended location.

Other U.S. patents, such as U.S. Pat. No. 3,072,357, issued to Sprague; No. 3,603,526, issued to Payne; No. 3,831,877, issued to Bennett; No. 3,840,713, issued to Carpentier; No. 3,902,679, issued to Bost; and No. 4,006,865, issued to Howard, all disclose alternative portable wire carts. However, all of them require that the wire be wound onto a reel which is a part of the cart itself, limiting the possibility of using a manufacturer supplied reel already containing the wire.

U.S. Pat. No. 3,990,653, issued to Marcell, discloses a wire cart for withdrawing wire from the center of cardboard boxes, an alternative method of providing wire.

Therefore, it is a objective of this invention to provide a new and useful portable apparatus for storing and transporting reels of wire for dispensing the wire from the reels.

SUMMARY OF THE INVENTION

A new and useful apparatus for storing and transporting reels of wire and dispensing the wire from the reels is provided. The reels are mounted on upwardly projecting spindles and retained there by their own weight, so that no removable parts are required to secure them to the cart. A guide is provided to restrict the lateral motion of the reel so as to prevent the wire from becoming tangled, to prevent pull on the wire from unseating the reel from the spindle and to align the wire with is intended objective such as a conduit. Additionally, a bar may be provided to frictionally contact the reel and retard its spinning after wire is withdrawn from the reel.

BRIEF DESCRIPTION OF THE DRAWINGS

Other objects and advantages of the invention will become apparent upon reading the following detailed description and upon reference to the drawings, in which.

While the invention will be described in connection with a preferred embodiment, it will be understood that it is nor intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
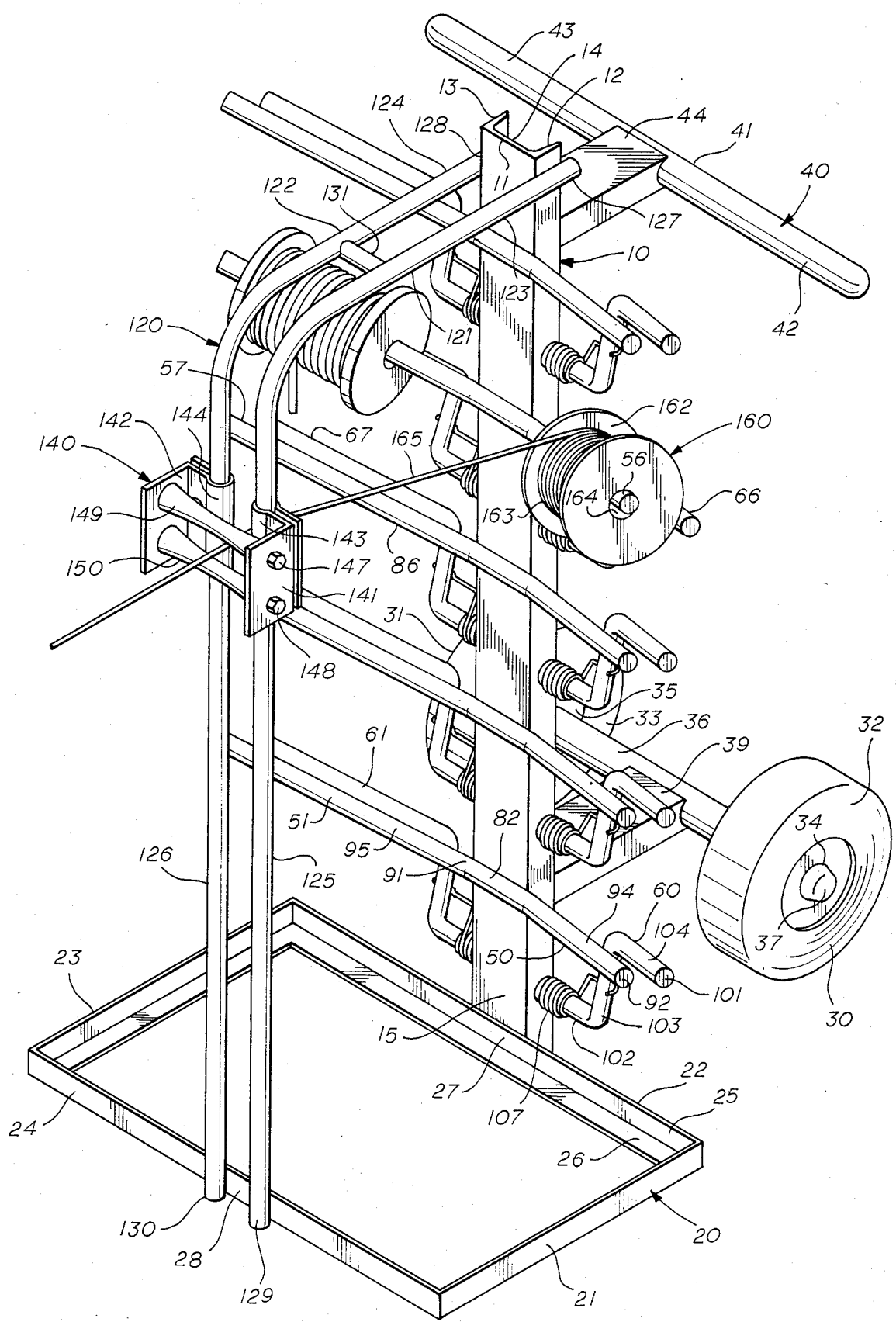
FIG. 1 is an perspective view of a preferred embodiment of the present invention.

Turning first to FIG. 1, there is shown a frame member 10 which is preferably a channel having a web 11 between two flanges 12 and 13. The frame member 10 has an upper end 14 and a lower end 15, to which is attached a base 20 including four sides 21,22,23, and 24, each preferably made of an angle shape having legs 25 and 26. The frame member 10 is preferably fixed connected as by welding to the base 20 at the mid point 27 of the side 22.

Wheel assemblies 30 and 31, which include rubber tires 32 and 33 mounted on steel hubs 34 and 35, respectively, are provided. Each of the wheel assemblies 30 and 31 is mounted upon an axle shaft 36 at its opposite ends 37 and 38. Axle shaft 36 is connected to the frame member 10 by a channel 39. The center line of the axle shaft 36 is located behind the frame member 10, as are the points of contract of the tires 32 and 33 with the floor.

A handle 40 is located above the wheel assemblies 30 and 31. It includes of a bar 41 having hand grip positions 42 and 43 at either end thereof and being fixedly connected to the frame member 10 by a channel 44. The location of the base 20, the wheel assemblies 30 and 31 and the handle 40 with respect to each other and to the frame member 10 are preferably such that when the base 20 is resting squarely upon the floor, the device is stable and the tires 32 and 33 do not contact the floor. A user may grasp the handle 40, preferably from behind, and pull it towards him to rotate the device rearwardly about the side 22 of the base 20 until a point on the outer surface of each of the tires 32 and 33 contacts the floor. Continued rearward motion of the handle will lift the base 20 from all contacts with the floor, leaving the device resting only upon the wheel assemblies 30 and 31. In this position the user may roll the device along the floor in a conventional manner. Alternatively, he may continue the rearward rotation of the device until the handle 40 also rests upon the floor, leaving the frame member 10 in a substantially horizontal position supported by the handle 40 and the wheel assemblies 30 and 31. Preferably the wheel assemblies 30 and 31 are located so that when the device is resting only on the wheel assemblies 30 and 31 and the handle 40 is at a comfortable height for an average size user, the weight of the loaded device will be approximately balanced above the wheel assemblies 30 and 31.

A spindle 50 an another spindle 51 are mounted to the frame member 10. Spindle 50 has a first end 90 adjacent the frame member 10 and a second end 92 opposite the frame member 10. A portion 94 of the spindle adjacent the second end 92 is adapted to accept a bore 164 of a reel 160. The reel 160 has spaced apart flanges 161 and 162 mounted to a hollow core 163 having the bore 164 therethrough. Reels such as reel 160 are commonly supplied by vendors with wire 165 wrapped around the core 163 between the spaced apart flanges 161 and 162.

The spindle 50 projects upwardly and forwardly from the frame 10. The portion 94 of the spindle 50 is preferably straight and also projects upwardly and forwardly so that a reel such as the reel 160, once it is placed over the second end 92 onto the spindle 50, is retained thereon and prevented from falling off the spindle 50 by gravity, as the upward and forward projection of the spindle 50 and of the portion 94 thereof upon which the reel 160 is mounted maintains the second end 92 of the spindle 50 at a higher position than the portion 94 of the spindle 50. The forward projection of the spindle 50 when the device is resting upon the base 20 becomes an upward projection when the device is rotated backwardly so that it is resting upon the wheel assemblies 30 and 31 and the handle 40, so that gravity retains the reel 160 upon the spindle 50 at all points between the upright and horizontal positions.

Figure 3:
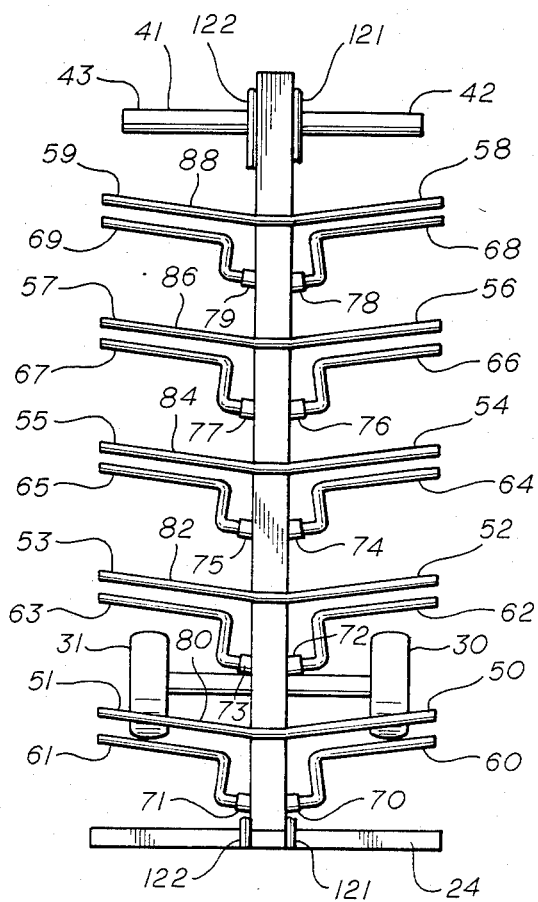
FIG. 3 is a front elevational view of the preferred embodiment of the present invention.
Figure 4:
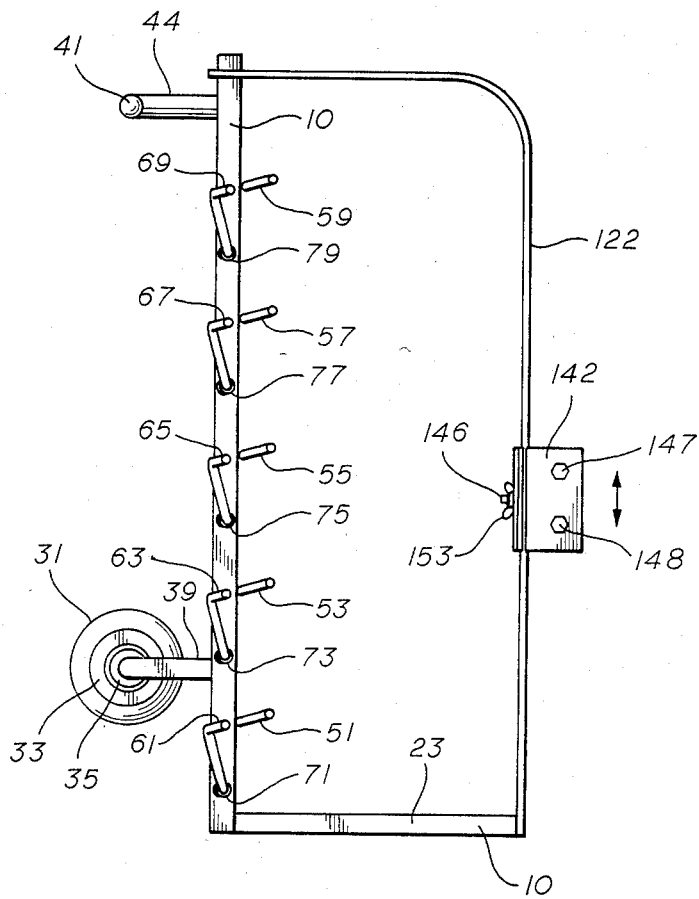
FIG. 4 is a side elevational view of the preferred embodiment of the present invention.

Similarly, spindle 51 had a first end 91, a second end 93 and a portion 95 intermediate them for the mounting of a reel such as the reel 160. Preferably, a single bar 80 forms boths spindle 50 and spindle 51, for ease of manufacture. As best seen in FIGS. 3 and 4, four additional bars, 82,84,86, and 88, form eight additional, substantially identical spindles, 52 and 53, 54 and 55, 56 and 57, and 58 and 59, respectively.

An anti-backlash bar 60 is mounted to the frame member 10 adjacent the spindle 50 for cooperation with the spindle 50. This bar 60 has a first end 100 adjacent the frame member 10 and second end 101 opposite the frame member 10. The bar 60 may also be divided into a first portion 102 adjacent the first end 100, a third portion 104 adjacent the second end 101 and a second portion 103 intermediate the first portion 102 and the third portion 104. Each of the three portions 102, 103 and 104 is preferably substantially straight, with the first and 104 each being parallel to each other but being laterally offset from each other. The first portion 102 and the second portion 103 are separated by a first bend 105 and a second portion 103 and the third portion 104 are separated by a second bend 106.

Figure 2:
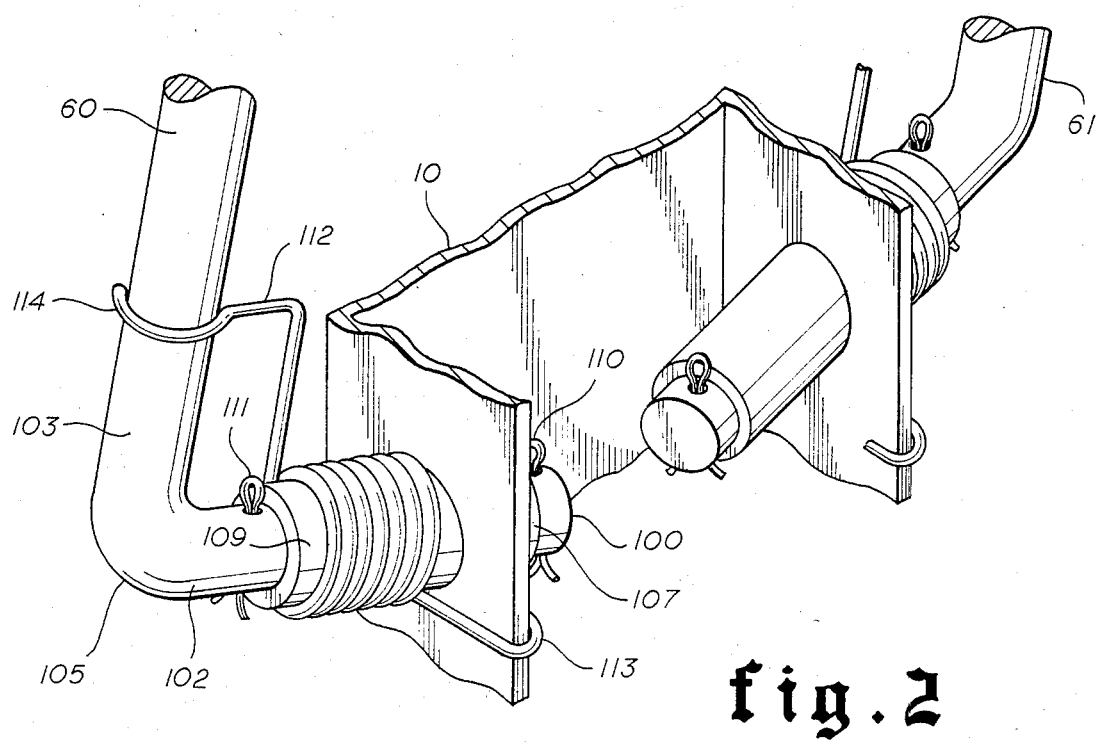
FIG. 2 is a detail of the connection of an anti-backlash bar to the frame of the preferred embodiment of the present invention.

As may be best seen in FIG. 2, the first end 102 of the anti-backlash bar 60 fits rotatably within a sleeve 107 which is fixedly attached to the frame member 10 as by welding. The sleeve 107 has a first end 108 and a second end 109, and the anti-backlash bar 60 is axially retained within the sleeve by a first pin 110 and a second pin 111 which pass through the anti-backlash bar 60 adjacent the first end 108 and the second end 109, respectively, of the sleeve 107. The sleeve 107 is also provided with resilient rotational means, preferably a coil spring such as the spring 112 shown coiled about the second end 109 of the sleeve 107. The spring 112 is provided with a first end 113 which engages the frame member 10 and second end 114 which engages the second portion 103 of the anti-backlash bar 60 to exert a rotational force upon the anti-backlash bar 60 in the direction shown by arrow 115.

The anti-backlash bar 60 is preferably mounted to the frame member 10 by the sleeve 107 with the first portion 102 of the anti-backlash bar 60 parallel to the portion 94 of the spindle 50. As the first portion 102 and the third portion 104 of the anti-backlash bar 60 are also preferably parallel to each other, as discussed above, the third portion 104 of the anti-backlash bar 60 is maintained parallel to the portion 94 of the spindle 50 at all points of rotation of the anti-backlash bar 60. When a user places a reel of wire such as the reel 160 over the spindle 50, the user first rotates the anti-backlash bar 60 away from the reel 160, against the force of the spring 107, be hand, so that the reel 160 may be placed over the spindle 50, and then releases the anti-backlash bar 60 so that the spring 107 forces the third portion 104 of the anti-backlash bar 60 into contact with one or both of the flanges 161 and 162 of the reel 160. The parallelism of the third portion 104 of the anti-backlash bar with the spindle 50 permits the third portion 104 to contact both flanges 161 and 162 of the reel 160, and also prevents the third portion 104 from imparting any axial force against the reel 160 which might tend to overcome the gravitational force imparted by the upward and forward projection of the spindle 50 and thereby urge the reel 160 off of the spindle 50. The force of the contact between the third portion 104 and the flanges 161 and 162 of the reel 160 in addition to the frictional drag created by the gravitational force of the reel 160 upon the spindle 50. When a user is removing the wire 165 by pulling it off of the real 160, thereby rotating the reel 160 about the spindle 50, the frictional drag is overcome by the tension exerted upon the wire 165 by the user. However, when the user ceases to exert that tension, such as when he no longer desires any more of the wire 165, the frictional force exerted by the third portion 104 of the anti-backlash bar 60 upon the reel 160 acts to terminate the rotation of the reel 160, thereby minimizes or eliminating the further and undesired unreeling or spilling of the wire 165 from the reel 160. It has been found that the gravitational frictional force alone is insufficient to rapidly terminate this rotation of the reel 160 thereby allowing substantial lengths of the wire 165 to unwind or "spill" from the reel 160 every time the user ceases to pull the wire 165 from the reel 160.

As seen in FIGS. 3 and 4, additional anti-backlash bars 61,62,63,64,65,66,67,68 and 69 are provided for spindles 51,52,53,54,55,56,57,58, and 59, respectively. Each of these anti-backlash bars is substantially identical to the anti-backlash bar 60, and each is mounted to the frame member 10 by a sleeve and spring similar to the sleeve 107 and the spring 112. Each also cooperated with its corresponding spindle in the same manner that the anti-backlash bar 60 and the spindle 50 cooperate. This multiplicity of spindles and anti-backlash bar allows a plurality of reels of wire such as the reel 160, containing either identical or different sizes or types of wire, to be mounted upon the device, thereby permitting the user to select from a plurality of available wire types or to carry reels of the same type wire or a combination of both at his option.

Additionally, a guide 140 is provided mounted upon a track 120. Track 120 preferably consists of two bars 121 and 122 having parallel, substantially horizontal first sections 123 and 124 and parallel, substantially vertical second sections 125 and 126, respectively. The first sections 123 and 124 are joined to the second sections 125 and 126 by bends 131 and 132, respectively. The first sections 123 and 124 have first ends 127 and 128, respectively, both of which are fixedly connected to the frame member 10 and are opposite the bends 131 and 132. The second sections 125 and 126 have second ends 129 and 130, respectively, which are joined to the side 24 of the base 20 opposite the bends 131 and 132. The two tracks may also be connected by a cross brace such as cross brace 133.

Figure 6:
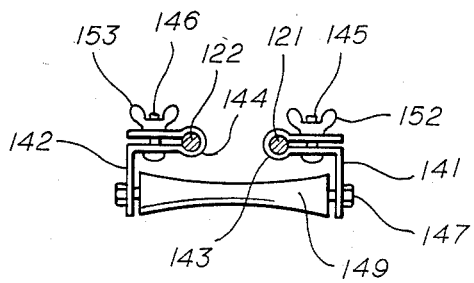
FIG. 6 is a top view of a guide of the preferred embodiment of the present invention.
Figure 5:
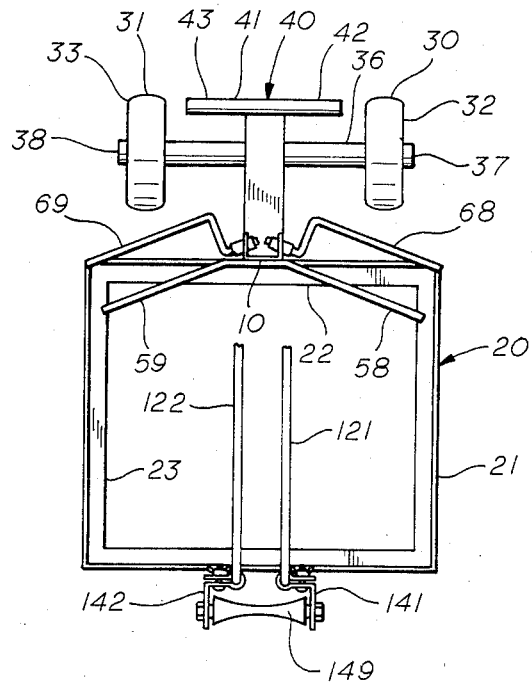
FIG. 5 is a top view of the preferred embodiment of the present invention.

Mounted upon the second sections 125 and 126 of the two bars 121 and 122 is a guide 140, as best shown in FIGS. 5 and 6. The guide 140 includes two side plates 141 and 142, each of which has a portion 143 and 144, respectively, substantially enclosing the bar 121 and 122. Bolts 145 and 146, each of which is provided with a wing nut 152 or 153, are provided to selectively clamp the side plates 141 and 142 tightly about the bars 121 and 122, respectively, if the user desires the fix the location of the guide 140. The wing nuts 152 and 153 may be loosened to move the guide 140 to another location on the track 120 or they may be left loose to allow the guide 140 to move in response to the angle of the wire 165 passing through the guide 140.

The side plates 141 and 142 are connected by axles 147 and 148, each of which has a roller 149 or 150, respectively, mounted thereon. The rollers 149 and 150 form the upper and lower boundaries of a passage 151, and the portions 143 and 144 of the side plates 141 and 142, respectively, for the left and right sides of the passages 151. A wire inserted through the passage 151 is thereby completely enclosed from lateral motion but provided with relatively low resistance to being pulled through the passage 151 by the user.

In use, on to ten reels of wire such as the reel 160 may be mounted upon the spindles 50 through 59, and one of the anti-backlash bars 60 through 69 may be engaged with each of the reels. The device may be wheeled into position and then placed upon its base 20 by a user with its forward end closest to the desired work place. One of the types of wire such as the wire 165 upon the frame is selected by the user, as his particular needs dictate, and the end of that wire 165 is inserted through the passage 151 of the guide 140. The user may adjust the guide 140 to whatever height he desires to provide the best angle for the wire 165 to enter that work place. If the work place is sufficiently close to the floor, the device may be located opposite the work place and the guide 140 moved opposite the work place. The user may commence to pull the wire 165 from the reel 160, causing the reel 160 to rotate. When the user ceases to pull the wire 165 from the reel 160, the frictional force of the anti-backlash bar 60 against the flanges 161 and 162 of the reel 160 causes the reel 160 to quickly stop rotating, minimizing or eliminating the spillage of the wire 165 from the reel 160.

The use of the guide 140 also prevents the tension force exerted by the user upon the wire 165, which is necessary to unreel the wire from the reel, from including any upward axial component which would tend to pull the reel 160 off of the spindle 50.

The device may also operate in a similar fashion for overhead wiring by resting it upon the wheel assemblies 31 and 32 and the handle 40, as described above.

Thus it is apparent that there has been provided, in accordance with the invention, as apparatus for storing and transporting wire on reels and for dispensing wire from the reels that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications and variation as fall within the spirit and broad scope of the appended claims.

What is claimed is:

1. A new and improved apparatus for storing and transporting a plurality of reels of wire, each reel having an axial bore therethrough, and for dispensing wire from any of the reels, comprising:
   (a) a frame including a front side and a back side;
   (b) a base connected to said frame;
   (c) a plurality of spindles connected to said frame and projecting upwardly from said frame, each of said spindles being adapted for insertion into the bore of the reel so that the reel may be mounted upon said spindle and the weight of the reel retains the reel upon said spindle and so that the reel may rotate as wire is pulled from the reel;
   (d) means for restricting the wire as a tension force pulls the wire from the reel mounted upon said spindle so that the application of the tension force to the wire does not lift the reel from said spindle and so that the wire may be dispensed at a desired height, said restricting means includes a guide having a passageway therethrough and a track, with said guide being mounted to and movable along said track, and with said track being located forward of said spindles and being connected to said frame; and
   (e) means for stopping the rotation of the reel mounted upon said spindle when wire ceases to be pulled from the reel.

2. The apparatus of claim 1 wherein the stopping means includes an arm rotatably mounted to said frame adjacent said spindle, a portion of said arm being resiliently urged into engagement with the reel mounted upon said spindle by a resilient rotational means so as to apply a frictional force resisting the rotation of the reel.

3. The apparatus of claim 2 wherein said arm includes an axis of rotation which is substantially parallel to the bore of the reel mounted on said spindle.

4. The apparatus of claim 2 wherein said portion of said arm which engages the reel is substantially parallel to the bore of the reel.

5. The apparatus of claim 1 wherein said spindles project upwardly and forwardly from said frame.

6. The apparatus of claim 1 further comprising a pair of wheels rotatably connected to said frame and wherein said frame may be backwardly rotated from a first position resting upon said base to a second position resting only on said pair of wheels and wherein the spindles project upwardly from said frame in both said first and said second positions.

7. The apparatus of claim 1 wherein said spindles project upwardly and forwardly from said frame.

8. The apparatus of claim 1 wherein said means for stopping the rotation of the reel mounted upon said spindle when wire ceases to be pulled from the reel is a backlash bar.

9. The apparatus of claim 2, wherein said resilient rotational means is a coil spring which engages said frame and said backlash bar.

10. The apparatus of claim 8 wherein said guide has rollers adjacent said passageway through said guide and said guide is fixedly movable along said track.

11. The apparatus of claim 8 wherein each of said spindles has a first end connected to said frame and a second end which the bore of the reel may pass over, and said frame has a lateral center line, and said first end of said spindle is closer than said second end to said lateral center line of said frame, and said track is located substantially in said lateral center line of said frame.

12. A new and improved apparatus for storing and transporting a plurality of reels of wire, each reel having an axle bore therethrough, and for dispensing wire from any of the reels, comprising:

a frame including a front side, a back side, and a lateral center line;

a base connected to said frame;

a plurality of spindles connected to said frame and projecting upwardly and forwardly from said frame, each of said spindles being adapted for insertion into the bore of the reel so that the reel may be mounted upon the spindle and the weight of the reel retains the reel upon said spindle and so that the reel may rotate as wire is pulled from the reel;

a plurality of arms rotatably mounted to said frame, with one of said arms being mounted adjacent one of said spindles for cooperation therewith, each of said arms including an axle of rotation which is substantially parallel to the bore of the reel mounted upon said cooperating spindle, and a portion of each of said arms being resiliently urged into engagement with the reel mounted upon said cooperating spindle so as to apply a frictional force resisting the rotation of the reel, said portion of said arm being maintained substantially parallel to the bore of the reel mounted upon said cooperating spindle;

a track located forward of said frame and substantially in said lateral center line of said frame and being connected to said frame; and a guide member having a passageway therethrough and having rollers adjacent said passageway, with said guide member being mounted to and fixedly movable along said track.

* * * * *